US011501301B2

(12) United States Patent
Sumpter et al.

(10) Patent No.: US 11,501,301 B2
(45) Date of Patent: Nov. 15, 2022

(54) TRANSACTION TERMINAL FRAUD PROCESSING

(71) Applicant: NCR Corporation, Atlanta, GA (US)

(72) Inventors: Jodessiah Sumpter, Roswell, GA (US); Matthew Robert Burris, Atlanta, GA (US)

(73) Assignee: NCR Corporation, Atlanta, GA (US)

(*) Notice: Subject to any disclaimer, the term of this patent is extended or adjusted under 35 U.S.C. 154(b) by 532 days.

(21) Appl. No.: 16/586,203

(22) Filed: Sep. 27, 2019

(65) Prior Publication Data
US 2021/0097540 A1 Apr. 1, 2021

(51) Int. Cl.
G06Q 20/40 (2012.01)
G06Q 20/20 (2012.01)
G06V 40/16 (2022.01)

(52) U.S. Cl.
CPC ....... *G06Q 20/4016* (2013.01); *G06Q 20/206* (2013.01); *G06Q 20/40145* (2013.01); *G06V 40/172* (2022.01); *G06V 40/174* (2022.01)

(58) Field of Classification Search
None
See application file for complete search history.

(56) References Cited

U.S. PATENT DOCUMENTS

| 10,346,675 | B1* | 7/2019 | Nagalla | G06V 40/70 |
| 2011/0016052 | A1* | 1/2011 | Scragg | G06Q 20/02 |
| | | | | 705/44 |
| 2012/0078787 | A1* | 3/2012 | Mehew | G06Q 20/40 |
| | | | | 705/44 |
| 2014/0067679 | A1* | 3/2014 | O'Reilly | G06Q 20/40145 |
| | | | | 705/44 |
| 2015/0066764 | A1* | 3/2015 | Crowell | G06Q 20/409 |
| | | | | 705/44 |

FOREIGN PATENT DOCUMENTS

AU 2017201198 A1 * 3/2017 ........... G07F 19/207

OTHER PUBLICATIONS

"There Really is a Way to Do That", dated Jun. 17, 2015, downloaded from https://www.marchnetworks.com/intelligent-ip-video-blog/there-really-is-a-way-to-do-that/ and attached as PDF file (Year: 2015).*

* cited by examiner

Primary Examiner — James D Nigh
Assistant Examiner — Margaret M Neubig
(74) Attorney, Agent, or Firm — Schwegman, Lundberg & Woessner

(57) ABSTRACT

Image analysis is performed on a user at a transaction terminal. Based on behaviors, expressions, and activities of the user, fraud or potential fraud is flagged. When fraud is flagged, the transaction terminal stops processing an active transaction on behalf of the user and alerts are sent. When potential fraud is flagged, images/video associated with the active transaction are sent for review and the active transaction may be suspended or permitted to proceed at the transaction terminal. In an embodiment, a same user conducting multiple transactions with different accounts at a same transaction terminal or multiple different transaction terminals within a configured period of time is automatically identified as fraud based on a fraud rule.

7 Claims, 5 Drawing Sheets

TRANSACTION TERMINAL FRAUD PROCESSING

BACKGROUND

Detection of fraud in the financial services industry is complicated. It is difficult to detect when a user is performing an actual transaction at an Automated Transaction Terminal (ATM) or when the user is performing a malicious act in an attempt to steal money or modify the ATM to steal future customer card information. Currently card skimming and card trapping have a combined industry loss of approximately 6 billion dollars annually in the ATM industry alone with the loss per attack approach 51 thousand dollars.

One technique used is to acquire customer card information through skimming or trapping. The thief then wirelessly transmits the stolen card details from the ATM where the information is stolen. After acquiring the card details and Personal Identification Numbers (PINs) for each customer account remotely, the thief replicates bank cards. Next, the thief visits the same ATM or different ATMs and use the replicated cards with the customer account information and PINs to withdraw funds from multiple different customer accounts.

The above-technique is difficult to detect because the thief appears to be using legitimate bank cards with legitimate PINs to access the customer accounts. In most cases, the only way to detect this situation is to discover the card skimming or trapping on the original ATM and determine how long it was there and the customers' accounts that accessed the ATM during that period and then have the customers change their accounts and change their PINs. New bank cards are also issued to the affected customers, which is costly to the bank. But all this has to be done before the thief replicates and uses the cards and often the financial institutions are not fast enough to prevent the theft.

As a result, substantial sums of money are lost by financial institutions every year to this type of theft.

SUMMARY

In various embodiments, methods and a transaction terminal for transaction fraud processing are provided.

According to an aspect, a method for transaction terminal fraud detection is presented. Images of a user are captured at a start of a transaction on a transaction terminal and features are derived from the images. A determination is made based on the features, transaction details for the transaction, and fraud rules whether fraud is present, fraud is not present, or fraud is potentially present for the transaction. The transaction is suspended at the transaction terminal when fraud is present, or fraud is potentially present.

According to another aspect, a method for transaction terminal fraud detection is presented. A first image of an operator is captured at a transaction terminal at a start of a first transaction. The first transaction is processed based on interactions between the operator and the transaction terminal by using a first account. A timer is started upon completion of the first transaction. A second image of the operator is captured at the transaction terminal or a different transaction terminal at a start of a second transaction. A determination is made as to whether the second image matches the first image. A second account is identified as being associated with the second transaction. The second transaction is flagged as potential fraud based on the second image matching the first image, the first account being different from the second account, and a current value of the timer. The second transaction is prevented from processing on the transaction terminal or the different transaction terminal based on the flagging of the second transaction.

In still another aspect, a transaction terminal for transaction fraud detection is presented. The transaction terminal includes a camera, a processor and non-transitory computer-readable storage medium having executable instructions. The executable instructions when executed by the processor from the non-transitory computer-readable storage medium cause the processor to: capture images of operators conducting transactions on the transaction terminal; set a timer for each operator on a first transaction by that operator; detect based on the images and the timers when a given operator is attempting multiple transactions using different accounts within a predetermined amount of time based on a given timer and corresponding images associated with the given operator; flag the operator as being a suspicious operator; and prevent at least one of the multiple transactions from processing on the transaction terminal based on identification of the suspicious operator.

DETAILED DESCRIPTION

Figure 1:
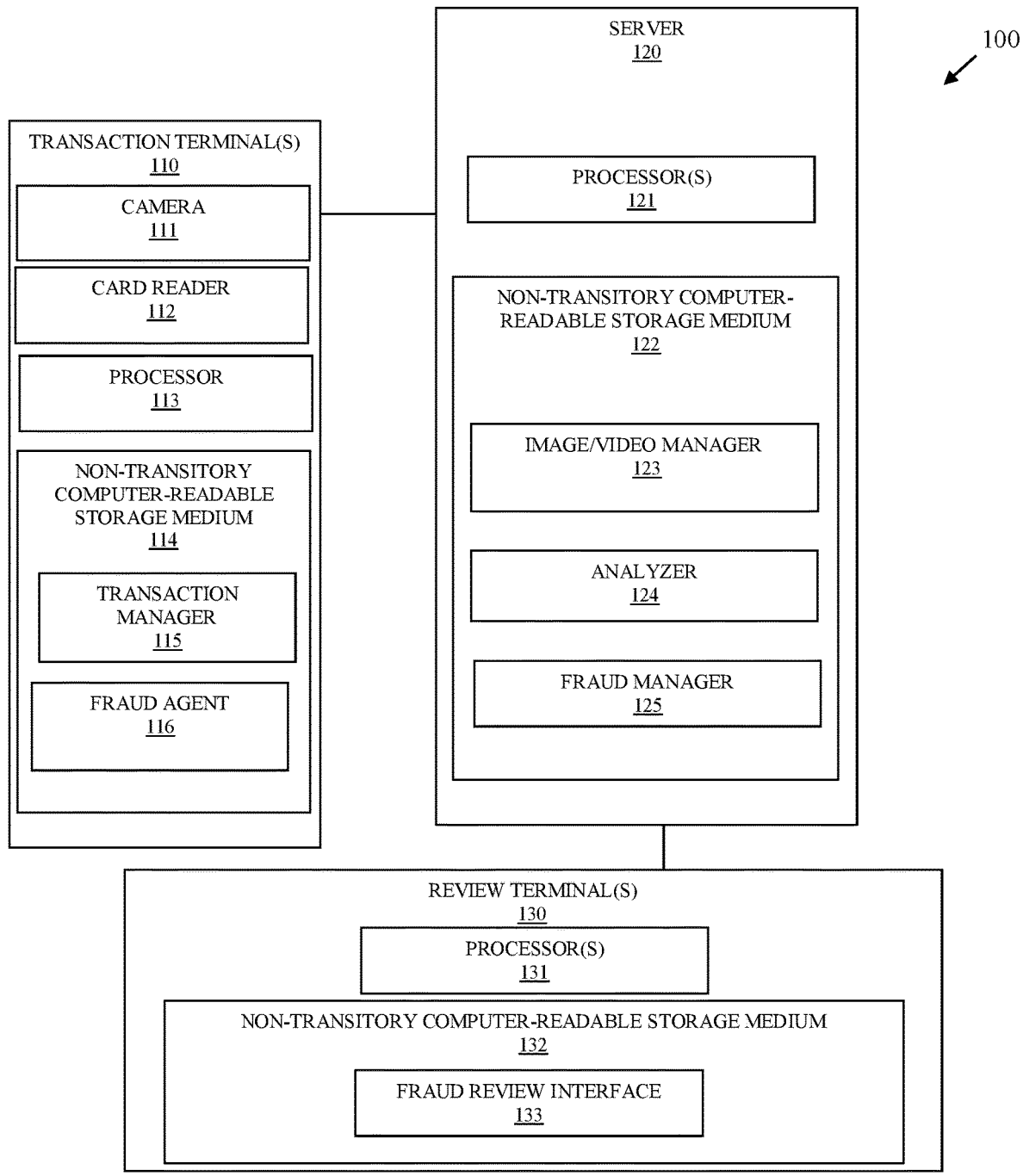
FIG. 1 is a diagram of a system for transaction terminal fraud processing, according to an example embodiment.

FIG. 1 is a diagram of a system 100 for transaction terminal fraud detection, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of transaction terminal fraud detection, presented herein and below.

As used herein and below, the terms "user," "consumer," "user," and "customer" may be used interchangeably and synonymously. The terms refer to an individual that is engaged in a transaction at a transaction terminal as discussed herein and below.

System 100 includes a plurality of processing devices and device types 110-130. The system 100 includes transaction terminal(s) 110, server 120, and review terminal(s) 130. Transaction terminal 110 includes a camera 111, a card reader 112, a processor 113, non-transitory computer-readable storage media 114 having executable instructions representing transaction manager 115 and fraud agent 116. The executable instructions when executed by processor 113 from non-transitory computer-readable storage media 114 cause processor 113 to perform the processing discussed below with respect to transaction manager 115 and fraud agent 116.

The server 120 includes processor(s) 121 and non-transitory computer-readable storage media 122 having executable instructions representing an image/video manager 123, an analyzer 124, and a fraud manager 125. The executable instructions when executed by processor 121 from non-transitory computer-readable storage media 122 cause processor 121 to perform the processing discussed below with respect to image/video manager 123, analyzer 124, and fraud manager 125.

The review terminal(s) 130 include a processor 131, non-transitory computer-readable storage media 132 having executable instructions representing a fraud review interface 133. The processor 131 of the review terminal 130 executes the executable instructions from the non-transitory computer-readable storage medium 132 causing processor 131 to perform the processing discussed below with respect to fraud review interface 133.

It is to be noted that there may be multiple servers 120, such that the different elements 123-127 may execute on a same server 120 or multiple different servers 120 networked together. Furthermore, the server 120 may be a Local Area Network (LAN)-based server 120 or a Wide-Area Network (WAN)-based server 120.

In an embodiment, server 120 is part of a cloud-processing environment that includes a plurality of servers logically cooperating of a network as a single accessible server 120.

During operation of system 100, transaction manager 115 notifies fraud agent 116 when a user has initiated a transaction on terminal 110. In an embodiment, fraud agent 116 listens on a port associated with card reader 112 for detection of a card entered or read wirelessly by card reader 112 as evidence that a transaction is being initiated by a user on terminal 110. Detection, by fraud agent 116, of a start of a transaction may also be achieved through events raised by either card reader 111 or transaction manager 115.

Upon initiation of a transaction, fraud agent 116 activates camera 111 to begin capturing images and/or video of the user performing the transaction. The images/video are sent to image/video manager 123 on server 120. A variety of other information may also be sent to fraud manager 125 by fraud agent 116, such as a transaction identifier for the transaction, card details read by card reader (such as user account number), calendar date, and time of day.

In an embodiment, fraud agent 116 streams and stores the images/video to a directory or data store accessible to image/video manager 123 and detected by image/video manager 123 based on a presence of files appearing in a directory associated with terminal 110. So, as images/video are captured by camera 111, the images/video are stored as files with unique names within a common directory accessible to and monitored by image/video manager 123.

Image/video manager 123 extracts pixel features for a face of the user from the images/video and creates a face print or template that can uniquely identify the user. Image/video manager 123 also extracts pixel features associated with a body and clothing of the user from the images/video.

The pixel features are provided as input to analyzer 124. Analyzer 124 also uses frames associated with the images/video as input. Image/video manager 123 may provide a directory location or file identifiers with the pixel features to analyzer 124, such that the images/video does not require any streaming of network passing.

Analyzer 124 processes the pixel features and the frames of the images/video to identify facial expressions associated with the face of the user from frame to frame in the images/video. Still further, Analyzer 124 identifies behaviors of the user while at terminal 110, this can be based on predefined behavior templates that the frames of the images/video are compared against. Analyzer 124 also identifies clothing types and perhaps a perceived sex of the user.

In an embodiment, analyzer 124 is a trained-machine learning algorithm that takes the pixel features as input and provides as output based on processing the frames, the facial expressions, behaviors, clothing types and colors, and perhaps sex of the user. The trained-machine learning algorithm derives an algorithm utilizing the features that when applied to the frames produces the output.

Fraud manager 125 associates the transaction details (customer account, transaction terminal identifier, time of day, calendar day, type of transaction, etc.) for the transaction with a face print or the user obtained from analyzer 124 along with user behaviors at the terminal 110 during the transaction, user clothing descriptions, and perhaps user sex.

Fraud manager 125 then compares the image analysis provided against historical transaction data for users and decides as to whether fraud is believed to present, fraud is potentially present, or fraud is not present. This can be done by scoring facial expressions, behaviors, clothing, and sex and comparing the score against a predefined threshold to determine whether fraud is present, fraud is potentially present, or fraud is not believed to be present. Furthermore, fraud manager 125 may also include a machine-learning algorithm that takes as input the factors (transaction details, facial expressions, behaviors, clothing, and sex) and provides as output a fraud value; the fraud value then compared against the predefined threshold to determine whether fraud is present, fraud is potentially present, or fraud is not believed to be present.

In an embodiment, fraud manager 125 identifies when a same user (based on face prints) that is conducting the transaction is associated with a different transaction that was performed by that user within a preconfigured period of time from terminal 110 or from a different terminal. For example, suppose the user conducting a transaction 5 minutes prior to the current transaction and the user is performing two separate transactions using two different accounts (based off of two different read cards provided by the user). The two transactions may be occurring on the same terminal 110 or the first transaction may have been processed on a different terminal 110. Transaction terminal identifiers for transaction terminals 110 may also be mapped to geographic locations or store locations, such that fraud manager 125 can discern when two transactions within 5-10 minutes apart (based on ending time of first transaction and start of the second transaction on terminal 110) are using different customer accounts and/or are in a same location at a same terminal 100, a remote locations from one another on different terminals 110 but within a same retail location, or geographically dispersed locations from one another on different terminals 110 from different retail locations. Fraud manager 125 can use rules to determine when the second transaction (current transaction being processed at terminal 110) is to be considered fraud or not. In an embodiment, a rule provides that when two separate transactions within a preconfigured period of time take place by a same user utilizing different accounts, the second transaction is to be considered fraud and should not be processed.

When fraud manager 125 determines based on the predefined threshold comparison that fraud is potentially present, the locations of the images/video for the transaction and the transaction details are sent to fraud review interface 133 on one or more review terminals 130. A fraud analyst may then review the images/video with transaction details and determine whether to flag the transaction as fraud or not fraud. Such manual review and subsequent determination may be fed back into a machine-learning algorithm along with the frames for the images/video to retrain the machine-learning algorithm and improve the machine-learning algorithm's accuracy. In this way, the accuracy of the machine-learning algorithm in detecting fraud from transaction details and images/video is continuously improving.

When fraud manager 125 determines that fraud exists, fraud manager 125 sends an alert to fraud agent 116. Fraud agent 116 shuts down the transaction on the user and may optionally shut down the terminal 110. This may entail retaining any card that the user may have inserted into card reader 112 and not returning such card to the user. Fraud agent 116 may also activate camera 111 to continuously record the user. Furthermore, fraud agent 116 may send an alert to personnel or devices of personnel regarding the fraud, such personnel located in proximity to terminal 110 (such as a teller or bank manager when terminal 110 is an ATM at a bank branch).

In an embodiment, terminal 110 is one of: an ATM, a Self-Service Terminal (SST), a grocery-store checkout, a Point-Of-Sale (POS) terminal.

In an embodiment, review terminal 130 is one of: a tablet, a phone, a laptop, a desktop, and a wearable processing device.

In an embodiment, terminal 110 is a mobile device (tablet, phone, or wearable processing device) of a user. In such embodiment, transaction manager 115 and fraud agent 116 are a mobile banking application on terminal 110.

In an embodiment, terminal 110 is a laptop or desktop and transaction manager 115 and fraud agent 116 are web-based applications activated from within a browser of the terminal 110.

In an embodiment, the transaction is to withdrawal funds from an ATM that is the terminal 110.

In an embodiment, the transaction is to transfer funds from one account to an external account not associated with the user, where the user is attempting to transfer funds from a user account to a different user account. In such embodiment, the terminal 110 can be an ATM, a phone, a tablet, a wearable processing device, a laptop, or a desktop.

There are several variations on how the system 100 can operate, some of which are discussed above and some of which are more completely discussed below with the other FIGS. 2-5.

Figure 2:
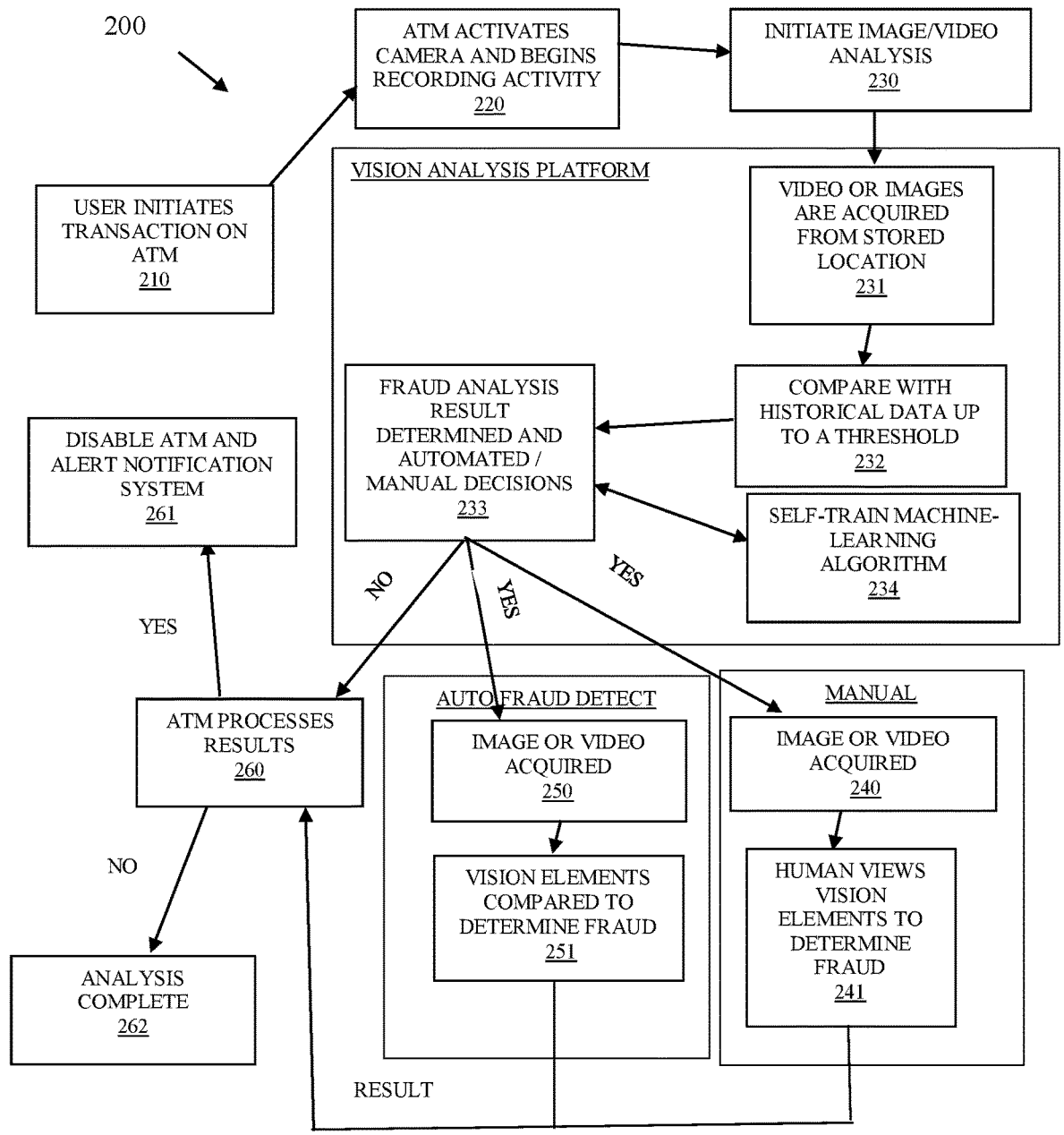
FIG. 2 is a diagram of processing associated with image analysis for transaction terminal fraud processing, according to an example embodiment.

FIG. 2 is a diagram of processing 200 associated with image analysis for transaction terminal fraud processing, according to an example embodiment.

At 210, fraud agent 116 detects that a user has initiated a transaction on an ATM (type of terminal 110).

At 220, fraud agent 116 activates camera 111 and begins recording the user and activity of the user while the transaction is being processed.

At 230, fraud agent 116 initiates image/video manager 123 based on streaming and storing the images/video to a network-accessible location. Image/video manager 123 detects the presence of the files for the image/video, at 231, at the network-accessible location.

At 232, image/video manager 123 and/or analyzer 124 compare the images/video against historical image/video data up to a predetermined amount of historical data.

At 233 and 234, analyzer 124 and/or fraud manager 125 performs fraud analysis based on image features associated with facial expressions, behaviors, clothing, and/or sex in view of the historical data and predefined fraud threshold value. This may entail one or more machine-learning algorithms (as was discussed above with FIG. 1), the image data and results are fed back into a self-training machine-learning algorithm at 234 to continuously improve the accuracy of fraud determinations by adjusting factors and weights for the image features and transaction details in the derived algorithm.

When no fraud is detected, at 233, fraud manager 125 sends a notice to fraud agent 116 on ATM 110. ATM 110 processes the no fraud determination, at 260, and the transaction from the user is processed with the analysis complete at 262.

When fraud is detected, at 233, fraud manager 125 determines from the image/video, at 250, based on comparison of a fraud score calculated and compared to a fraud threshold, at 251, to notify fraud agent 116, at 260, on ATM 110. Fraud agent 116 disables the transaction or the ATM 110 at 261 and sends alerts to bank personnel or bank devices.

When fraud is potential, at 233, fraud manager 125 determines from the image/video, at 240, based on comparison of a fraud score calculated and compared to the fraud threshold, to notify fraud review interface 133 on review terminal 130. A fraud analyst operates fraud review interface 133 to inspect elements in the images/video, at 241, to decide as to whether fraud is present or not. Fraud review interface 133 based on options selected by the fraud analyst sends a notification to fraud agent 116. When the notification indicates no fraud, at 260, the ATM 110 completes the transaction on behalf of the user and analysis is complete at 262. When the notification indicates fraud, at 260, fraud agent 116 disables the transaction and/or the ATM 110 and alerts are sent to bank personnel and/or bank personnel-operated devices, at 261.

One now appreciates how real-time vision analysis may be performed on users conducting financial transactions at transaction terminals 110 and determinations can be made as to whether the transaction is fraud, is not fraud, or is potential fraud. Such determinations are based on a variety of visual and non-visual factors including: total number of transactions performed by a user within a preconfigured period of time, number of different accounts used with each transaction by the user, facial features of the user, behaviors of the user at the terminal 110, clothing worn by the user at the terminal 110, perceived sex of the user, transaction details (accounts used, transaction terminal identifiers, time or day, calendar date, etc.), and the like. In this way, fraudulent transactions that were conventionally believed incapable of being detected and thwarted can now be stopped and prevented in real time with system 100.

In an embodiment, a facial print derived from facial images of the user may be recorded and stored in a repository when the user is determined to have attempted a fraudulent transaction at terminal 110. This facial print may be shared through cloud-based services or other arrangement across multiple different financial institutions. In this way, fraud manager 125 may quickly and rapidly send alerts and suspend a transaction as soon as the user is identified with the facial print. In an embodiment, an identity of the user associated with the facial print is not retained, such that the user remains anonymous as to that user's true identity, but that user is uniquely identifiable through the facial or face print.

In an embodiment, when a customer of a financial institution has registered his/her face with their bankcard, fraud manager 125 can quickly and rapidly identify when an account associated with the registered customer is being used for a transaction at terminal 110 by a different user based on a face print of the different user and a comparison of that face print to the registered face print of the registered customer.

In an embodiment, fraud manager 125 performs and initial face print comparison for a current user's face print against a predetermined number of face prints associated with all users that have conducted transactions within a predetermined period of time before the current user's face print is obtained for a current transaction. This allows fraud manager 125 to obtain a match to the current user's face print with a previous face print of that same user when that same user conducted one or more different transactions within the predetermined period of time before the current transaction. Transaction details for the current transaction and the previous transactions that map to the face print can then be compared to determine if a same user is conducting multiple transactions (at the same terminal 110 or different terminals 110) utilizing different customer accounts for the financial institution. In such cases, fraud manager 125 may quickly shut down the current transaction (retaining any bank card used by the user) and/or shut down the terminal 110 based on a rule associated with this situation that identified this as a fraudulent transaction.

In an embodiment, when fraud manager 125 identifies potential fraud and activates fraud review interface 133, a notice is send to fraud agent 116 to suspend the transaction during the manual review and display a message to the user that the network is slow or some other innocuous notice that does not alert the user to the review so as to scare the user away but keeps the user at the terminal 110 while the review is being performed.

In an embodiment, the trained machine-learning algorithms are continuously trained based on manual reviews utilizing the fraud review interface 133 by providing the image features and transaction features as input to the algorithm and providing the output expected (fraud, no fraud, potential fraud). This training may also be used on subsequent transactions that were initially flagged as no fraud by fraud manager 125 and later determined to be fraud. In this way, the machine-learning algorithms are continuously adjusting weights and factors for the transaction details, image attributes (face print, clothing, behaviors, etc.) for the derived algorithm.

These and other embodiments are now discussed with reference to the FIGS. 3-4.

Figure 3:
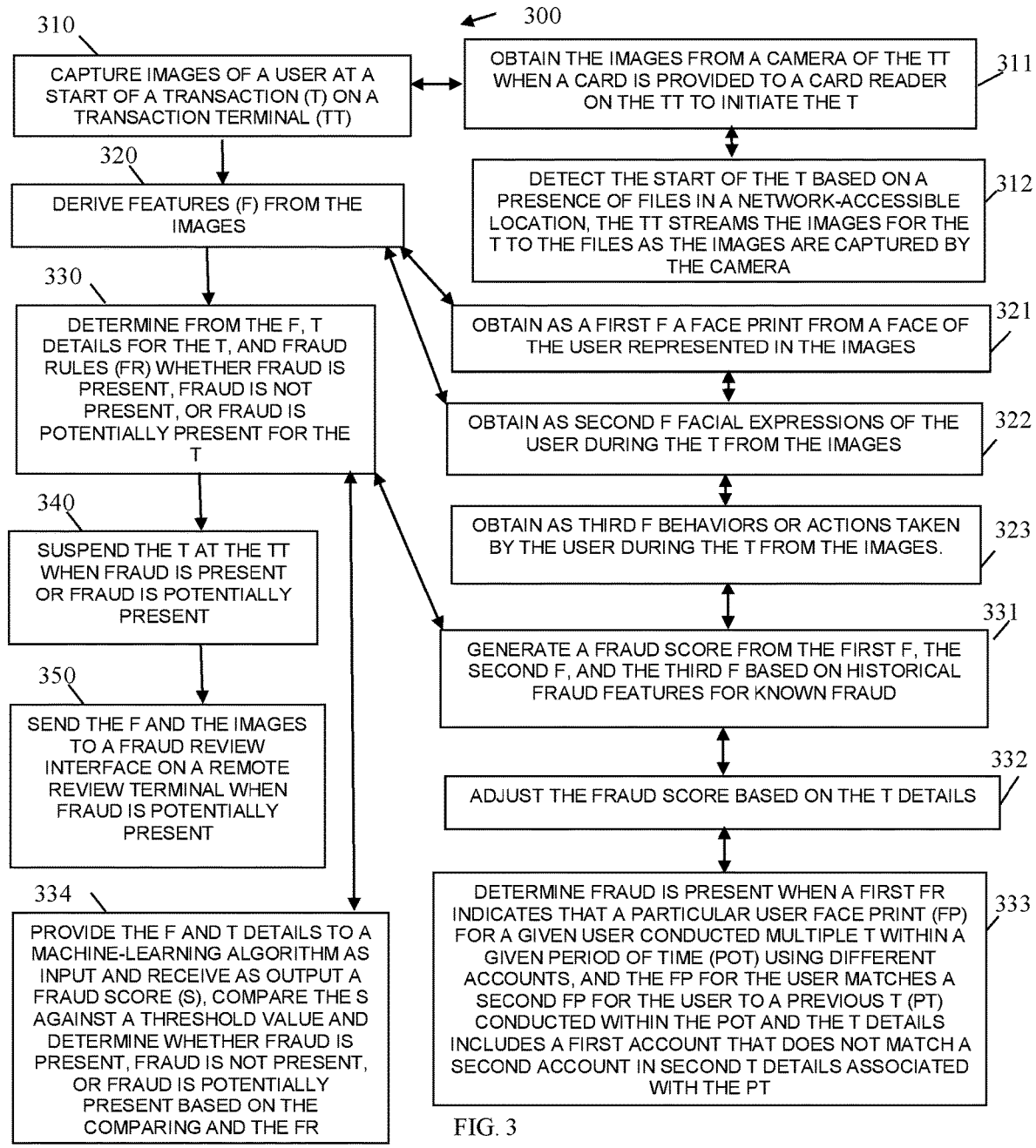
FIG. 3 is a diagram of a method for transaction terminal fraud detection, according to an example embodiment.

FIG. 3 is a diagram of a method 300 for transaction terminal fraud detection, according to an example embodiment. The software module(s) that implements the method 300 is referred to as a "visual transaction fraud detector." The visual transaction fraud detector is implemented as executable instructions programmed and residing within memory and/or a non-transitory computer-readable (processor-readable) storage medium and executed by one or more processors of a device. The processor(s) of the device that executes the visual transaction fraud detector are specifically configured and programmed to process the visual transaction fraud detector. The visual transaction fraud detector may have access to one or more network connections during its processing. The network connections can be wired, wireless, or a combination of wired and wireless.

In an embodiment, the device that executes the visual transaction fraud detector is the server 120. In an embodiment, the server 120 is a cloud-based processing environment comprising a collection of physical servers cooperating as a single logical server. In an embodiment, the server 120 is a Local-Area Network (LAN)-based server or a Wide-Area Network (WAN)-based server.

In an embodiment, the visual transaction fraud detector is all or some combination of image/video manager 123, analyzer 124, fraud manager 125, and/or the processing 200 described in the FIG. 2 above.

At 310, the visual transaction fraud detector captures images of a user at a start of a transaction on a transaction terminal.

In an embodiment, the transaction terminal is an ATM, a SST, a POS terminal, or a mobile device operated by a user through a mobile banking application.

In an embodiment, at 311, the visual transaction fraud detector obtains the images from a camera of the transaction terminal when a card is provided to a card reader on the transaction terminal to initiate the transaction. In an embodiment, the card reader is a contact-based card reader that includes a card slot. In an embodiment, the card reader is a contactless wireless card reader.

In an embodiment of 311 and at 312, the visual transaction fraud detector detects the start of the transaction based on a presence of files in a network-accessible location. The transaction terminal using the fraud agent 116 streams the images for the transaction to the files as the images are captured by the camera.

At 320, the visual transaction fraud detector derives features from the images. These can be any of the features referenced above with the FIGS. 1 and 2.

In an embodiment of 312 and 320, at 321, the visual transaction fraud detector obtains as a first feature a face print from a face of the user represented in the images.

In an embodiment of 321 and at 322, the visual transaction fraud detector obtains as second features facial expressions of the user during the transaction from the images.

In an embodiment of 322 and at 323, the visual transaction fraud detector obtains as third features behaviors or actions taken by the user during the transaction from the images.

At 330, the visual transaction fraud detector determines from the features, transaction details for the transaction, and fraud rules whether fraud is present, fraud is not present, or fraud is potentially present for the transaction.

In an embodiment of 323 and 330, at 331, the visual transaction fraud detector generates a fraud score from the first feature, the second features, and the third features based on historical fraud features for known fraud.

In an embodiment of 331 and at 332, the visual transaction fraud detector adjusts the fraud score based on the transaction details.

In an embodiment of 332 and at 333, the visual transaction fraud detector determines fraud is present when the fraud rule indicates that a particular user face print for a given user conducted multiple transactions within a given period of time using different accounts. The face print for the user matches a second face print for the user to a previous transaction conducted within the given period of time and the transaction details include a first account that does not match a second account in second transaction details associated with the previous transaction.

In an embodiment, at 334, the visual transaction fraud detector provides the features and transaction details to a machine-learning algorithm as input and receiving as output a fraud score, comparing the fraud score against a threshold value and determining whether fraud is present, fraud is not present, or fraud is potentially present based on the comparing and the fraud rules.

At 340, the visual transaction fraud detector suspends the transaction at the transaction terminal when fraud is present, or fraud is potentially present.

In an embodiment, at 350, the visual transaction fraud detector sends the features and the images to a fraud review interface on a remote review terminal when fraud is potentially present. In an embodiment, the remote review terminal is terminal 130 and the fraud review interface is interface 133.

In an embodiment, the visual transaction fraud detector detects based on the timer and a specific account associated with both the first transaction and the second transaction being performed by different operators for different operations and flags such activity as fraud or potential fraud using the first image of the first operator and the second image for the second operator and a common accessed account for both transactions.

It is noted that although discussion is provided for two accounts accessed by a same person, other conditions can be configured by financial institutions as well. For example, when two or more different operators are accessing a same or different accounts at a same terminal and the operators were previously flagged as being suspicious, customer rules may be enforced by the visual transaction fraud detector to detect and report fraud or potential fraud.

Figure 4:
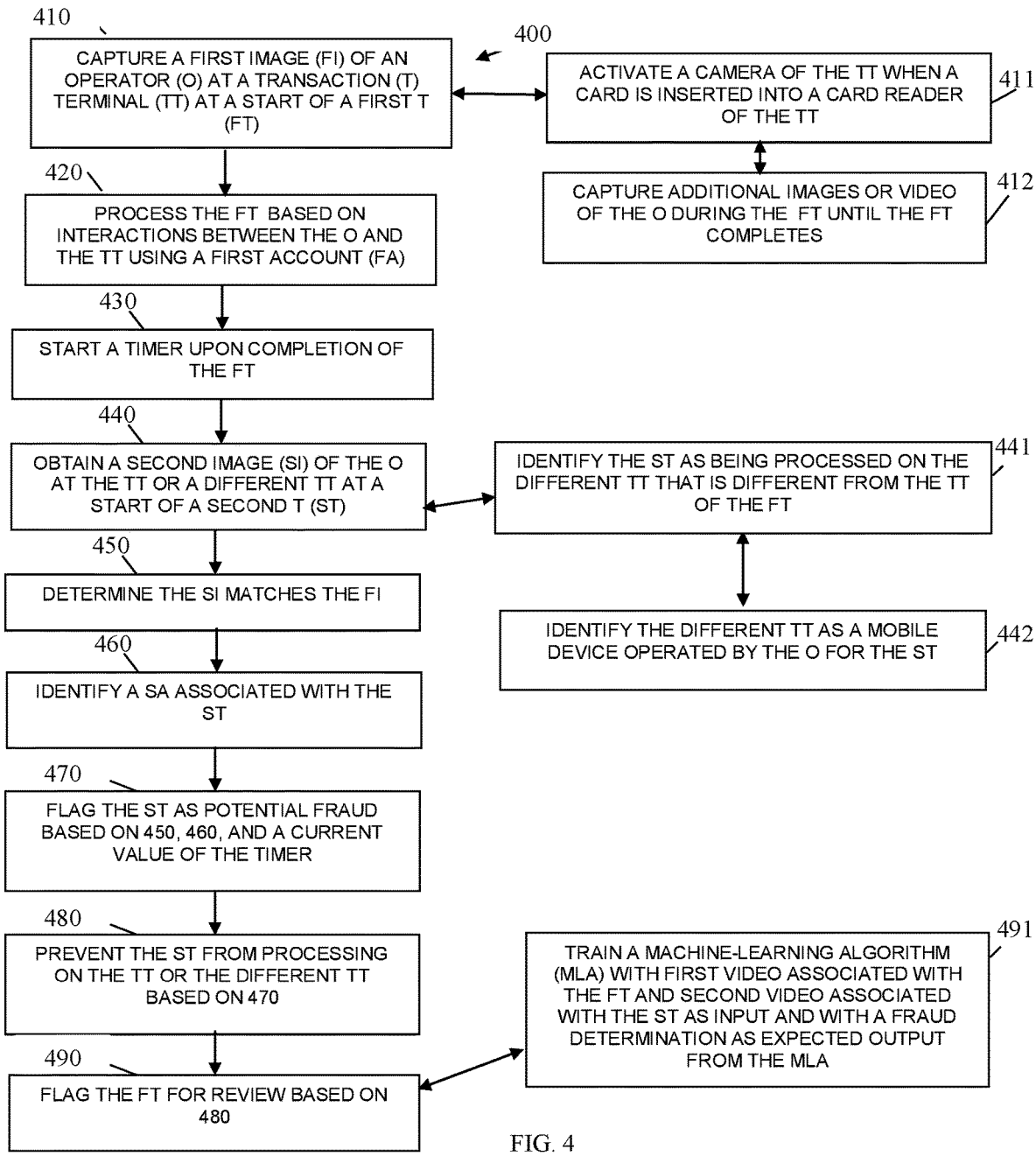
FIG. 4 is a diagram of another method for transaction terminal fraud detection, according to an example embodiment.

FIG. 4 is a diagram of another method 400 for transaction terminal fraud detection, according to an example embodiment. The software module(s) that implements the method 400 is referred to as a "transaction fraud detector." The transaction fraud detector is implemented as executable instructions programmed and residing within memory and/or a non-transitory computer-readable (processor-readable) storage medium and executed by one or more processors of a device. The processors that execute the transaction fraud detector are specifically configured and programmed to process the transaction fraud detector. The transaction fraud detector may have access to one or more network connections during its processing. The network connections can be wired, wireless, or a combination of wired and wireless.

In an embodiment, the device that execute the transaction fraud detector is the server 120. In an embodiment, the server 120 is a cloud processing environment, a LAN server, or a WAN server.

In an embodiment, the transaction fraud detector is all of, or some combination of: image/video manager 123, analyzer 124, fraud manager 125, the processing 200, and/or the method 300.

The transaction fraud detector presents another and, in some ways, enhanced processing perspective of the method 300.

At 410, the transaction fraud detector captures a first image of an operator at a transaction terminal at a start of a first transaction.

In an embodiment, at 411, the transaction fraud detector activates a camera of the transaction terminal when a card is inserted into a card reader of the transaction terminal.

In an embodiment of 411 and at 412, the transaction fraud detector captures additional images or video during the first transaction until the first transaction completes.

At 420, the transaction fraud detector processes the first transaction based on interactions between the operator and the transaction terminal using a first account.

At 430, the transaction fraud detector starts a timer upon completion of the first transaction.

At 440, the transaction fraud detector obtains a second image of the operator at the transaction terminal or a different transaction terminal at a start of a second transaction.

In an embodiment, at 441, the transaction fraud detector identifies the second transaction as being processed on the different transaction terminal that is different from the transaction terminal of the first transaction.

In an embodiment of 441 and at 442, the transaction fraud detector identifies the different transaction terminal as a mobile device operated by the operator.

At 450, the transaction fraud detector determines the second image matches the first image.

At 460, the transaction fraud detector identifies a second account associated with the second transaction.

At 470, the transaction fraud detector flags the second transaction as potential fraud based on 450, 460, and a current value of the timer.

At 480, the transaction fraud detector prevents the second transaction from processing on the transaction terminal or the different transaction terminal based on 470.

In an embodiment, at 490, the transaction fraud detector flags the first transaction for review based on the preventing.

In an embodiment of 490 and at 491, the transaction fraud detector trains a machine-learning algorithm with first video associated with the first transaction and second video associated with the second transaction as input and with a fraud determination as an expected output from the machine-learning algorithm.

Figure 5:
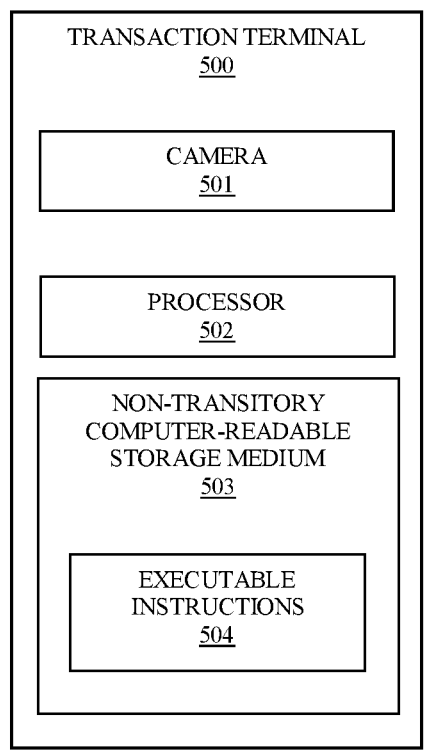
FIG. 5 is a diagram of a transaction terminal for transaction fraud detection, according to an example embodiment.

FIG. 5 is a diagram of a transaction terminal 500 for transaction fraud detection, according to an example embodiment. The terminal 500 includes a variety of hardware components and software components. The software components of the terminal 500 are programmed and reside within memory and/or a non-transitory computer-readable medium and execute on one or more processors of the terminal 500. The terminal 500 communicates over one or more networks, which can be wired, wireless, or a combination of wired and wireless.

In an embodiment, the terminal 500 assists and participates, inter alia, in the processing described above with the FIGS. 1-4.

The terminal 500 includes: a camera 501, a processor 502, and a non-transitory computer-readable medium 503 comprising executable instructions 504.

The executable instructions 504 when executed by the processor 502 from the non-transitory computer-readable storage medium 503 cause the processor 502 to: 1) capture images of operators conducting transactions on the transaction terminal 500; 2) set a timer for each operator on a first transaction by that operator; 3) detect based on the images and the timers when a given operator is attempting multiple transactions using different accounts within a predetermined amount of time based on a given timer and corresponding images associated with the given operator; 4) flag the operator as being a suspicious operator; and 6) prevent at least one of the multiple transactions from processing on the transaction terminal 500 based on identification of the suspicious operator.

In an embodiment, the transaction terminal 500 is: an ATM, an SST, a kiosk, and a POS terminal.

In an embodiment, a face print taking from the images for the given operator is retained in storage or in a remote network storage for comparison and flagging the given operator on all subsequent transactions attempted by the given operator on the transaction terminal 500.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   capturing a first image of an operator at a transaction terminal at a start of a first transaction;
   processing the first transaction based on interactions between the operator and the transaction terminal using a first account;
   starting a timer upon completion of the first transaction;
   obtaining a second image of the operator at the transaction terminal or a different transaction terminal at a start of a second transaction;
   determining the second image matches the first image;
   identifying a second account associated with the second transaction;
   flagging the second transaction as potential fraud based on the determining, the identifying, and a current value of the timer; and
   preventing the second transaction from processing on the transaction terminal or the different transaction terminal based on the flagging.

2. The method of claim 1 further comprising, flagging the first transaction for review based on the preventing.

3. The method of claim 1, flagging further includes training a machine-learning algorithm with first video associated with the first transaction and second video associated with the second transaction as input and with a fraud determination as an expected output from the machine-learning algorithm.

4. The method of claim 1, wherein capturing further includes activating a camera of the transaction terminal when a card is inserted into a card reader of the transaction terminal.

5. The method of claim 4, wherein activating further includes capturing additional images or video during the first transaction until the first transaction completes.

6. The method of claim 1, wherein obtaining further includes identifying the second transaction as being processed on the different transaction terminal that is different from the transaction terminal of the first transaction.

7. The method of claim 6, wherein identifying the second transaction as being processed on the different transaction terminal further includes identifying the different transaction terminal as a mobile device operated by the operator.

* * * * *